June 2, 1931.  E. V. HILL  1,808,351
PSYCHROMETRIC DEVICE
Filed May 31, 1927
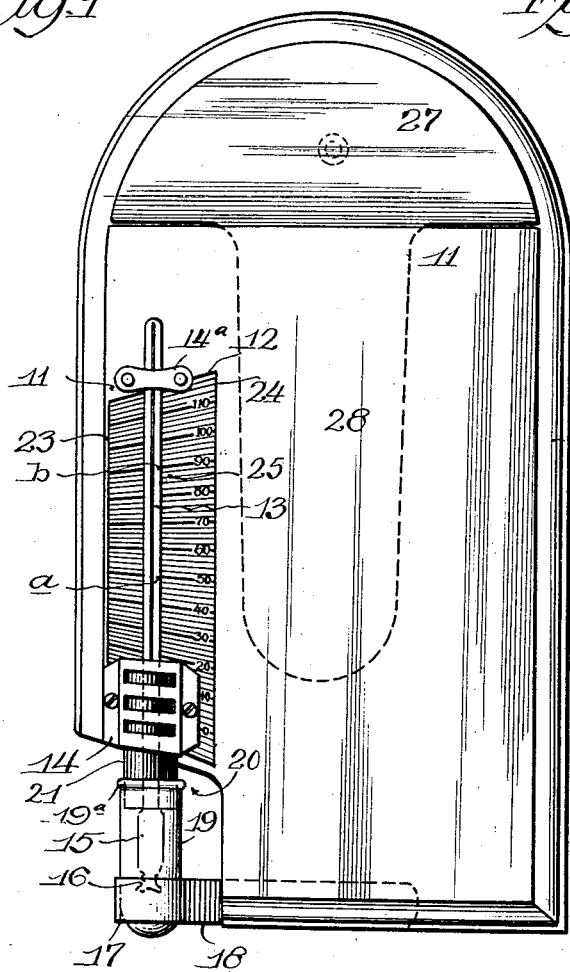
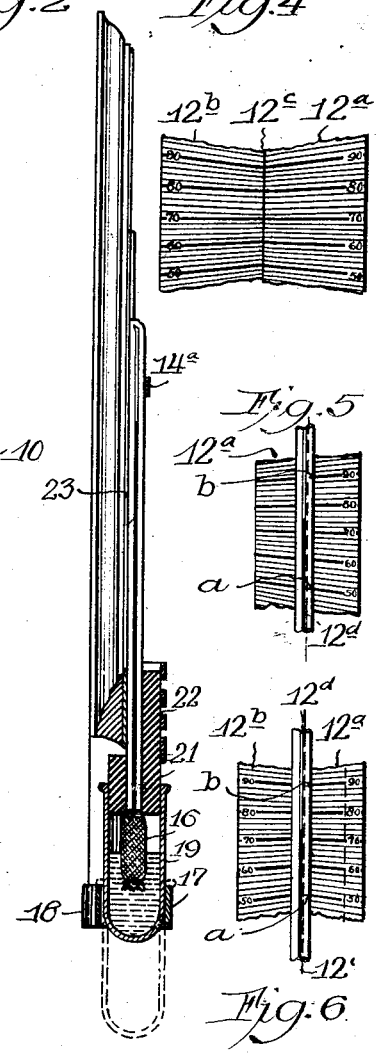
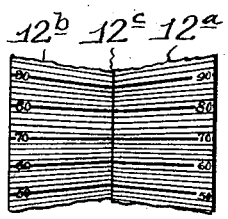
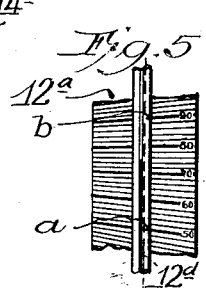
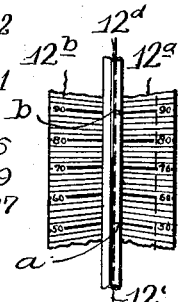
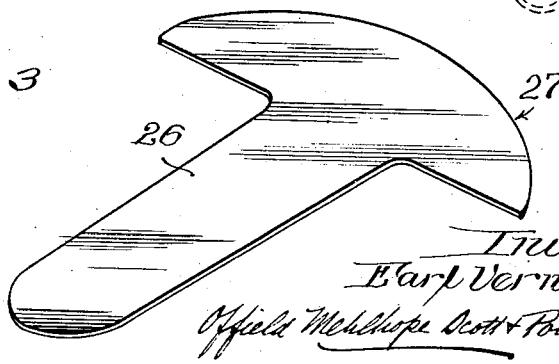

Patented June 2, 1931

1,808,351

UNITED STATES PATENT OFFICE

EARL VERNON HILL, OF CHICAGO, ILLINOIS

PSYCHROMETRIC DEVICE

Application filed May 31, 1927. Serial No. 195,393.

This invention relates to improvements in psychrometric instruments and consists of the matters hereinafter described and more particularly pointed out in the appended claim.

Psychrometric instruments as now generally made include two thermometers,—one for taking dry readings and one with the bulb provided with a wick to be moistened for taking wet readings.

One object of the present invention is to provide a psychrometric device in which but a single thermometer is used and which contains parts associated with the thermometer so as to make it possible to quickly and conveniently take a dry reading and a wet reading from the same thermometer.

Another object of the invention is to provide an improved scale which may be applied to any one of a number of the same kind of thermometers with the same bore and length of stem to produce an accurately reading thermometer at a greatly reduced cost. In the manufacture of thermometers, the positions of the mercury or other expanding fluid for two or more, generally two, temperatures, as for example 90° and 50°, are accurately determined and are marked on the stem of the tube. As is well known, the distance on the stem between said marks will vary on several apparently identical tubes owing to the impossibility of producing tubes with stems having identical bores throughout their lengths.

Several methods are used for providing a scale with graduations in proportion to the distance between the two or more points thus marked on the stem of the tube and indicating the position of the thermometric fluid therein at the two or more known degrees of temperature. In one method, an expensive scaling machine is employed for accurately dividing the space between said marks and then marking on a card or plate the number of graduations or degrees represented by the difference between the two accurate, known readings corresponding to the marks on the thermometer stem and for then marking said card and thermometer above and below said marks with like graduations.

In another method of providing proper graduations for thermometers, scales are manufactured in large numbers comprising scales of different classes with varying distances between the graduations to correspond with the known temperatures marked on the stems. These scales are then classified for thermometers of different types and after the two or more marks corresponding to definite temperatures are indicated on a thermometer tube, that scale coming most nearly to correspond with the two known marks on the thermometer tube is selected and applied to the tube.

The first of the above methods is manifestly quite expensive and makes the cost of producing accurately reading thermometers considerable. The second, while cheaper, does not result in accurately reading thermometers. In connection with the thermometer of my improved psychrometric device, I provide a form of scale which may be used in connection with any thermometer upon which the two or more definite temperatures, as for example 90° and 50° have been indicated, with the result that an accurately reading thermometer is produced at small cost.

These and other advantages of my invention will appear more fully as I proceed with my specification.

In the drawings:—

Figure 1 is a front elevation of a psychrometric device embodying my invention.

Figure 2 is a side elevation of the same partly in vertical section.

Figure 3 is a perspective view of a member preferably included with the device.

Figures 4, 5 and 6 are detailed views which will be referred to more particularly hereafter.

Referring now to that embodiment of the invention illustrated in the drawings:—10 indicates a board or base upon which the scale, the thermometer and the associated parts of my improved psychrometric device are mounted. 11 indicates a card attached to the base. Said card bears a scale 13 which will be referred to more particularly hereafter. 13 indicates the stem of a thermometer mounted on said base in association with the scale 12 by means of clips 14, 14ª. 15 indicates the bulb of the thermometer on which is mounted a wick 16.

Below the thermometer stem and mounted in a ring 17 carried on a bracket arm 18 attached to the back of the base or part 10, is a vertically movable cup 19 which normally encloses the thermometer bulb 15. Said cup has a flange or lip 19ª at its top to present a stop adapted to strike against the ring 17 and arrest the movement of the cup when depressed downwardly to a point below the bulb. The board or base 10 is cut away as indicated at 20 to provide space for said cup 19. 21 indicates a stopper mounted on the thermometer stem 13 above its bulb 15 in position to engage within and close the cup 19. As shown, the stopper extends above the space 20 of the base where it is cut to provide a half round collar part 22 which is embraced between the bottom clip 14 and the board or base 10, thereby at once providing an efficient connection for the stopper and for the thermometer tube.

Referring now to the scale 12:—23 indicates a vertical line graduated equally between two points spaced apart a distance approximating but not greater than the least distance to be found between fixed known graduations of the size of the thermometer tube to be used and graduated above and below said points at like distances,—the entire graduation running, as illustrated, from 0° to 120°. 24 indicates a second line spaced to the right, as shown, from the line 23 and graduated to represent a like number of degrees to the graduations on the line 23 but with the graduations on the line 24 somewhat greater than the graduations on the line 23. These graduations on the second line are numbered to correspond with the numbering of the graduations on the first line and graduations of like number are then connected by lines 25. As a result, there will appear on the scale a series of lines diverging, in the case illustrated, from the left towards the right, representing degrees of graduation. The graduations represented by said lines, when associated with a thermometer extending vertically across said lines, as in the case of the thermometer 13, will vary in vertical length, as the thermometer is moved from the position of the line 23 to the position of the line 24. In applying a thermometer, therefore, to the scale, the known graduations, marks 50° and 90° in this case, indicated respectively at $a$ and $b$, namely the marks accurately determined on the thermometer stem when the thermometer is made, are brought to position by movement of the thermometer tube from the line 23 towards the line 24 until said marks $a$ and $b$ are brought accurately to correspond with the lines indicated on the scale as 50° and 90°. The scale will then accurately read at other points on the thermometer.

It will be manifest that no matter how the distance between the marks $a$ and $b$ varies on different thermometers applied to the scale, said scale may always be properly adjusted to the thermometer to give correct readings by moving the thermometer from left to right until it is brought to registering position as described. After being brought to this position it is attached in place by means of the clips 14 and 14ª.

In the use of the improved psychrometric device, the cup 19 is filled with water and is then brought to position to be closed by the stopper 21. In a short time the water in the cup will come to the same temperature as the surrounding air. The thermometer will then give correct dry bulb readings. When it is desired to determine psychrometric conditions, the dry bulb reading is first taken. The cup 19 is then withdrawn downwardly until its lip 19ª comes to bear in supporting engagement with the ring 17. This leaves the thermometer bulb 15 with its water-soaked wick exposed. By a fan or other suitable device the wick 16 is then cooled by evaporating the water in the wick until the wet bulb temperature is indicated, when the thermometer is again read to get the correct wet reading. The cup 19 is then returned to position with its upper end closed by the stopper 21.

By use of the cup 19, containing water in which the wick-covered thermometer bulb 15, 16 is immersed and of the stopper 21 which closes said cup, the thermometer may be used to get a dry reading since the water in the cup will always have the temperature of the surrounding atmosphere and there can be no evaporation of the water to affect the reading of the thermometer.

It will be noted that both readings are taken from the same thermometer. Thus, that error which is to be found in all psychrometric devices including two thermometers, due to the error to be found in any thermometer, is eliminated. Thus my improved psychrometric device gives more accurate readings than the ordinary psychrometric devices now used including two thermometers.

For convenience I preferably provide a pocket back of the card 11 to receive the flat stem or handle 26 of a fan 27 made of cardboard or sheet metal. This fan may be finished to conform with the general outline of the board, as shown, and is always at hand for use when taking a wet reading.

At the right of the scale 12 the board has a space 28 on which, if desired, may be provided a psychrometric chart.

It may be found somewhat awkward, or at least to consume considerable time for good results, to apply the thermometer tube to the scale 12 after the scale has been attached to the board or base in the manner hereinbefore described. I have, therefore, devised a simpler and more ready method for adjusting the scale to the thermometer after the thermometer itself has been attached to the board. To this end I provide a double scale, as indicated in Figures 4, 5 and 6. This scale comprises a scale 12ª identical with the scale 12 shown in Figure 1 and a scale 12ᵇ which is a scale of the same kind but with the lines reversed. That is to say, whereas in the scale 12ª the graduation lines diverge towards the right, in the scale 12ᵇ they diverge towards the left, the several corresponding graduation lines meeting in the vertical line 12ᶜ. These scales are cut along the line 12ᶜ, leaving the two separate reverse scales 12ª and 12ᵇ. The thermometer tube 13 is attached to the board in proper position by means of clips such as 14, 14ª with a space sufficient between the back of the thermometer tube and the face of the board to allow for the insertion of the scale. One of the scales, for example, the scale 12ª, is then moved on the board transversely back of the theremometer tube until the 90° graduations and the 50° graduations are caused to register respectively with the marks b and a on the thermometer tube. A line 12ᵈ is then drawn under the tube with the tube as a guide for the drawing implement vertically across the graduations on the scale 12ª. This scale is then cut along a line 12ᵈ. The scale 12ª is then fixed in place with its graduation marks 90° and 50° in positions corresponding to the points b and a on the tube. The second scale 12ᵇ may now be slipped from the other side of the tube under the first named scale 12ª and adjusted transversely until the graduation marks 90° and 50° borne by it are brought to register with the marks b and a on the thermometer tube. This will produce the result shown in Figure 6 wherein appears a scale symmetrically disposed on both sides of the theremometer tube.

While in describing my invention I have referred to several details of mechanical construction and arrangement of parts, it will be understood that the invention is in no way limited thereto except as may be pointed out in the appended claim.

I claim as my invention:

A psychrometric instrument comprising a base, a thermometer with a bulb at its bottom end mounted on said base, a scale associated therewith, means providing a stopper fixed to said thermometer above said bulb, a wick on the bulb of said thermometer, a water containing cup enclosing said wick-covered bulb and normally held in closed relation with respect to said bulb by its engagement with said stopper, and a supporting device carried by the base below said bulb, said supporting device and cup having parts adapted to interengage to support said cup when said cup is depressed below said stopper to expose said wick to the surrounding air.

In testimony that I claim the foregoing as my invention, I affix my signature this 23 day of May, A. D. 1927.

EARL VERNON HILL.